(12) United States Patent
Strussione

(10) Patent No.: US 12,435,650 B2
(45) Date of Patent: Oct. 7, 2025

(54) NO LASH DUAL STEM I.C.E. VALVE

(71) Applicant: Anthony Strussione, Sterling Heights, MI (US)

(72) Inventor: Anthony Strussione, Sterling Heights, MI (US)

( * ) Notice: Subject to any disclaimer, the term of this patent is extended or adjusted under 35 U.S.C. 154(b) by 0 days.

(21) Appl. No.: 18/487,465

(22) Filed: Oct. 16, 2023

(65) Prior Publication Data
US 2025/0035016 A1    Jan. 30, 2025

Related U.S. Application Data

(60) Provisional application No. 63/488,137, filed on Mar. 2, 2023.

(51) Int. Cl.
| | |
|---|---|
| *F01L 1/30* | (2006.01) |
| *F01L 1/053* | (2006.01) |
| *F01L 1/08* | (2006.01) |
| *F01L 1/18* | (2006.01) |
| *F01L 3/08* | (2006.01) |

(52) U.S. Cl.
CPC ............... *F01L 1/30* (2013.01); *F01L 1/0532* (2013.01); *F01L 1/08* (2013.01); *F01L 1/181* (2013.01); *F01L 3/08* (2013.01); *F01L 2001/0535* (2013.01); *F01L 2001/0537* (2013.01); *F01L 2305/02* (2020.05)

(58) Field of Classification Search
CPC . F01L 1/0532; F01L 1/08; F01L 1/181; F01L 1/30; F01L 3/08; F01L 2305/02
USPC ......... 123/90.24, 90.25, 90.26, 90.27, 90.44, 123/90.6
See application file for complete search history.

(56) References Cited

U.S. PATENT DOCUMENTS

| | | | | |
|---|---|---|---|---|
| 2,858,818 | A * | 11/1958 | Bailey | F01L 1/30 123/90.26 |
| 5,058,540 | A * | 10/1991 | Matsumoto | F01L 13/0042 123/90.6 |
| 6,948,468 | B1 * | 9/2005 | Decuir, Jr. | F01L 1/34 123/90.27 |
| 7,077,088 | B1 * | 7/2006 | Decuir, Jr. | F01L 1/024 123/90.6 |

FOREIGN PATENT DOCUMENTS

| | | | | |
|---|---|---|---|---|
| DE | 102009012597 A1 | * | 9/2010 | ................ F01L 1/08 |
| JP | 2009185649 A | * | 8/2009 | .............. F01L 1/024 |
| WO | WO-03040525 A1 | * | 5/2003 | ................ F01L 1/30 |

* cited by examiner

*Primary Examiner* — Jorge L Leon, Jr.

(57) ABSTRACT

An improved cylinder head valve assembly design 10 that allows the valve head 16 to open and close at higher RPM's without valve float and no lash adjustments. More power is generated which can equate to better gas mileage. The design also allows for a lighter camshaft 30 enclosed in an oil compartment 62 for better cooling and less overall engine weight.

20 Claims, 10 Drawing Sheets

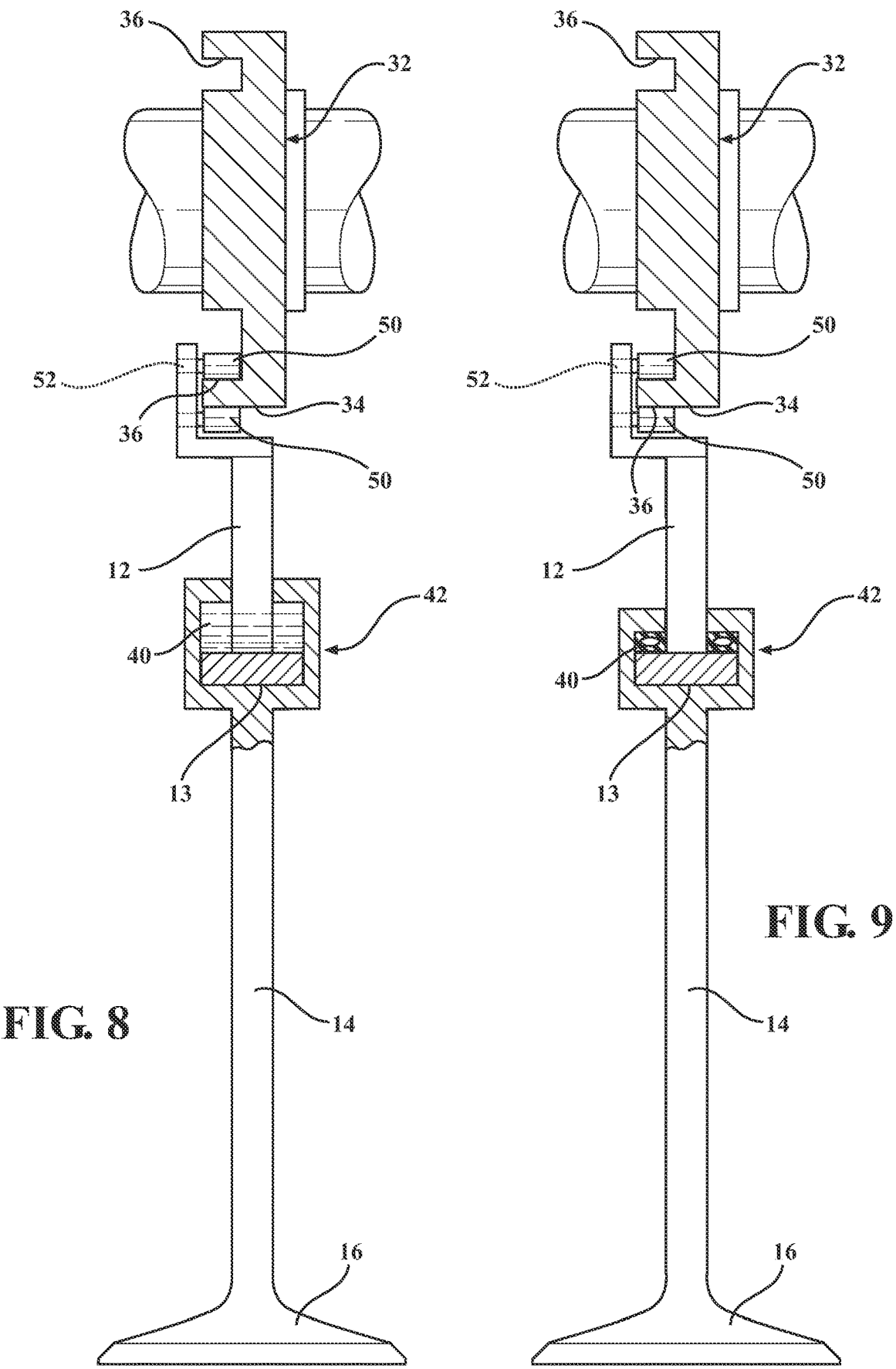

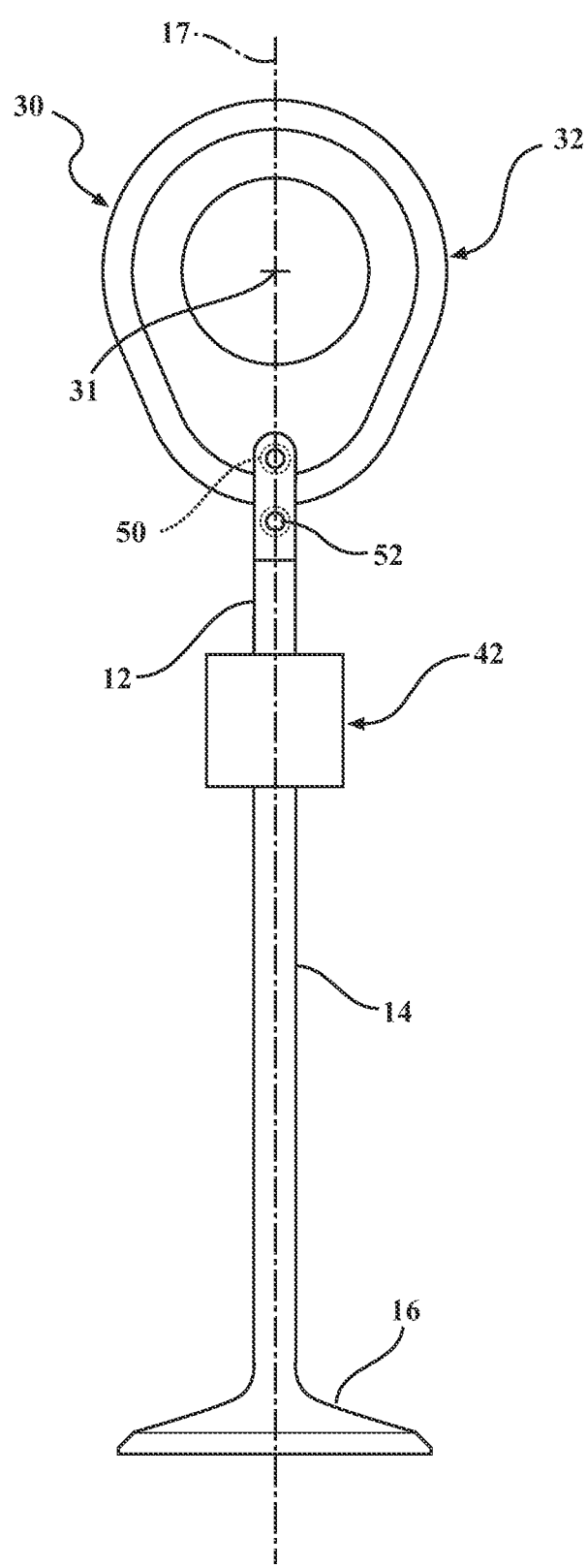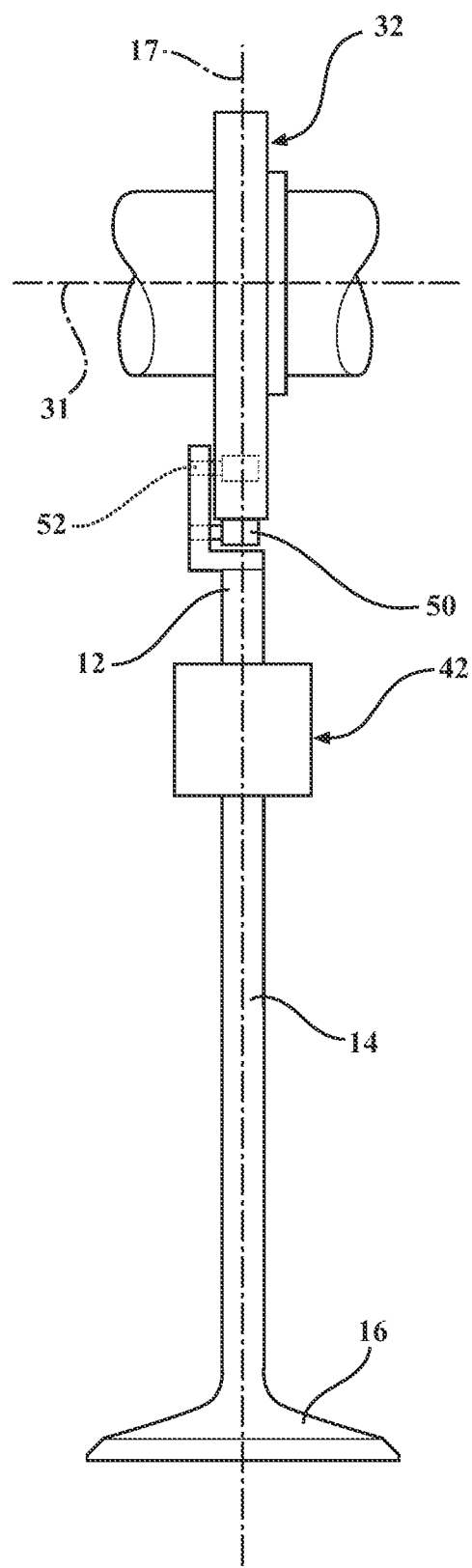
FIG. 15
FIG. 16

NO LASH DUAL STEM I.C.E. VALVE

FIELD OF THE INVENTION

The present invention relates to modern internal combustion engine valves that consist of rocker arms, rocker arm springs, lifters, poppets, cam followers and the like that are used to open and close the valves. These types of assemblies are used to seal the valves properly and to avoid valve float at high RPM's. These types of assemblies also require valve lash adjustments.

BACKGROUND OF THE INVENTION

A general example of a present day engine valve configuration is shown in a cross sectional view FIG. 1 (prior art) and will be referenced to in succeeding figures. Conventional internal combustion engine valve designs can typically include a rocker arm assembly that requires springs, cam followers, lifters, poppets or tappets and valve lash adjustments that are required for the engine valves to seal properly when actuated. However this design limits RPM due to valve float commonly known in the field. To prevent valve float tighter springs are used. Along with tighter springs a heavy camshaft is best. Tighter springs allows for higher RPM's. However, the pressure from tighter springs contributes to less power being produced overall in order to open the valves. It also requires valve lash adjustments at high RPM's to insure the valve seals properly due to the tolerances throughout the valve assembly.

SUMMARY OF THE INVENTION

FIGS. 2-16 presents the new design. The new design shows a valve assembly with its working components. The assembly does not require a rocker arm, rocker arm springs, cam followers, lifters, poppets, or tappets to seal the valve when actuated. However in the presented design a rocker arm is optional without rocker arm springs, cam followers, lifters, poppets or tappets. shown in the later figures. The figures clearly show how the valve stem assembly is actuated through the roller bearings attached to the upper valve stem and the cam lobe surfaces they directly contact. The cam shaft can have 2 concentric lobes consisting of a combination of 3 bearing surfaces in varying designs as shown. The lobes allow the motion that is required to open and close the valve assembly according to the cams lift and duration when rotating. The upper valve stem is connected to the lower valve stem with a shared housing where they contact each other when opening. The housing also contains an internal spring, a spring retainer, a fluid, rubber or any heat resistant pliable material as shown. These essential feature eliminates the need for valve lash adjustments. The features within the valve stem assembly also allows the upper valve stem, the lower valve stem and its shared enclosure components to move in the same common motion when opening and closing the valve head. The camshaft is enclosed with a cover that creates an oil compartment to allow sufficient oiling throughout the camshafts bearing surfaces and valve assembly roller bearings. These mentioned design features can be applied to dual overhead camshaft (DOHC) or a single overhead camshaft (SOHC) cam shaft with a rocker arm assembly or without a rocker arm assembly and used for both intake and exhaust motion. The camshaft/camshafts can actuate a single valve assembly or multiple assemblies throughout the cylinder head. These features can also be applied to a 2 stoke engine or a 4 stroke engine for both intake and exhaust strokes. All combined features equate to less power loss, more power generated or better gas mileage.

BRIEF DESCRIPTION OF THE DRAWINGS

Reference will now be made to the attached drawings, when read in combination with the following detailed description, wherein like reference numerals refer to like parts throughout the following figures, and in which:

FIG. 8-9 is a cross sectional view that shows alternative methods to eliminate valve lash adjustments.

FIG. 15-16 shows a schematic view of the preferred design of the cam lobe and valve alignment.

DETAILED DESCRIPTION OF PREFERRED EMBODIMENT

Figure 1:
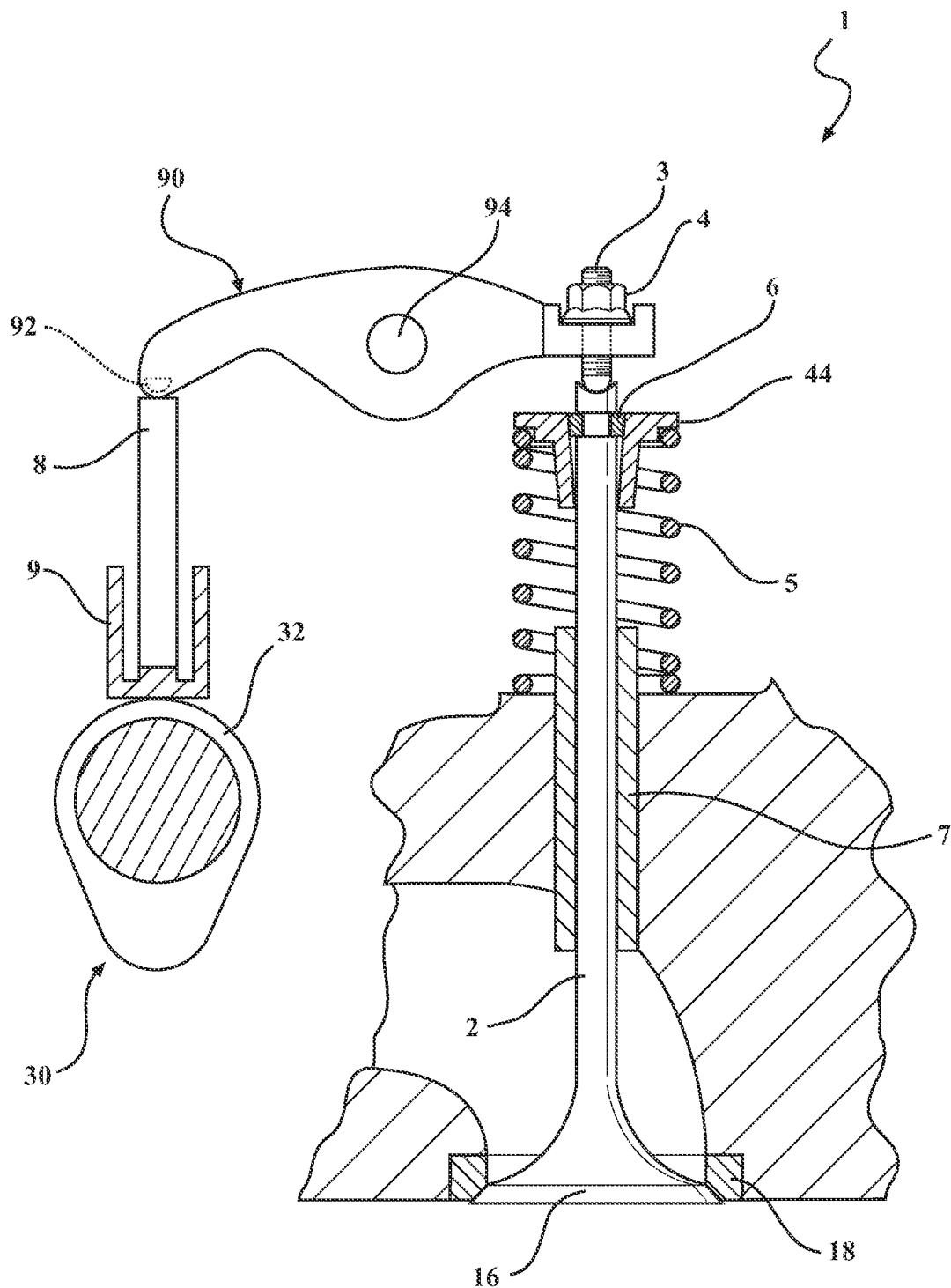
FIG. 1 (prior art) Generally illustrates a conventional internal combustion engine valve assembly with a rocker arm, rocker arm spring and cam follower.
Figure 2:
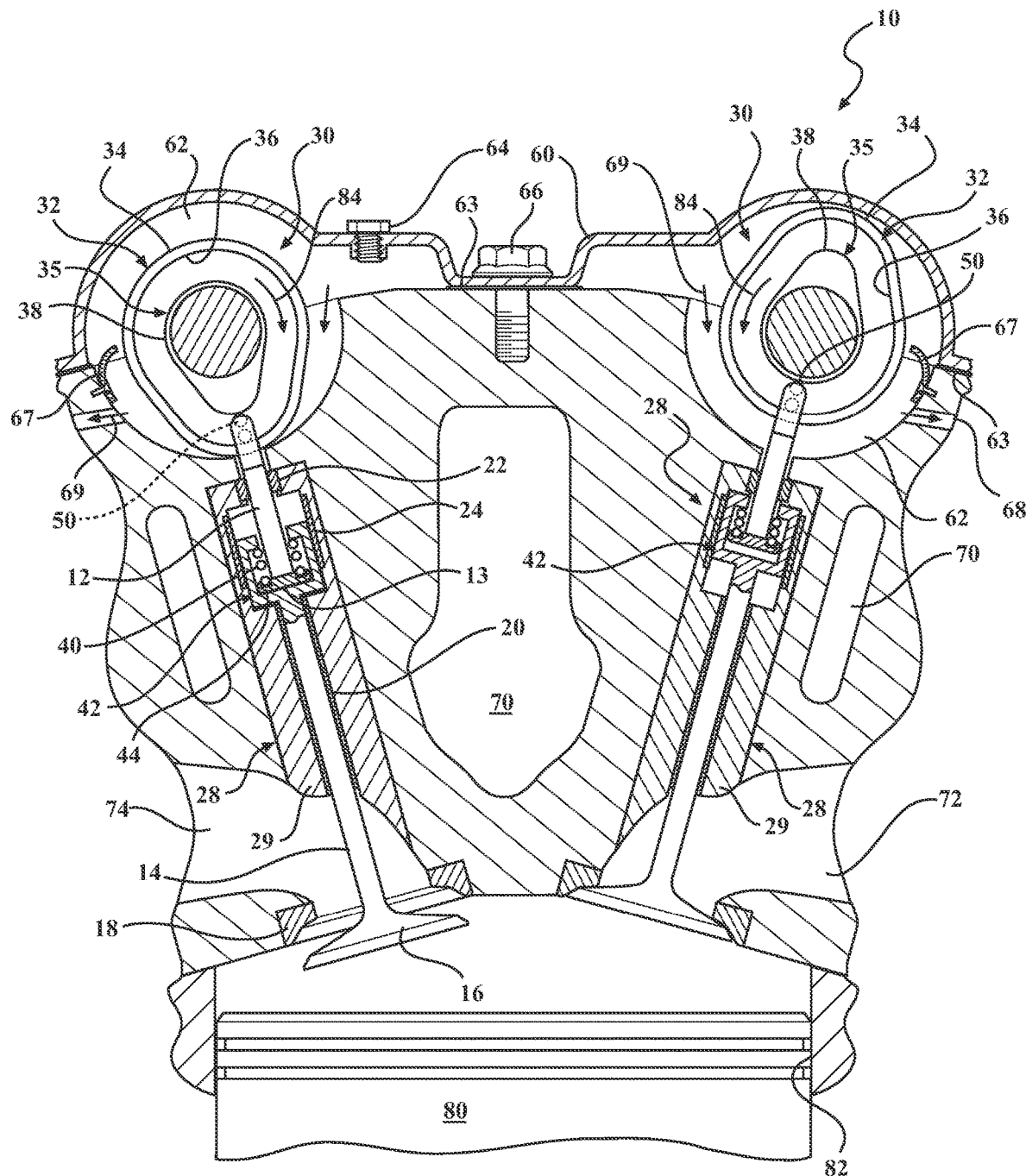
FIG. 2 Presents a cross sectional view of a DOHC cylinder head engine valve assembly with new design features that can be utilized in the proceeding drawings.

Given the description of a typical engine valve assemblies shown in FIG. 1 (prior art) it shows a valve assembly 1 containing a rocker arm assembly 90 with a fixed pivot point 94. The valve stem 2 contacts the lash adjusting screw 3 with a locking nut 4. A spring retainer 44 is secured to the valve stem with a collet 6. The valve retainer holds a spring 5. The rocker arm assembly is actuated by a push rod 8 that has a cam follower 9. The cam follower contacts the cam shaft 30 at lobe 32. The new design presented is best shown with all its working components in FIG. 2. The cylinder head valve assembly 10 holds the camshafts 30 which has attached outer cam lobe 32 and inner cam lobe 35 with outer lobe surface 36 and an inner lobe surface 38. The two cam lobes rotate simultaneously. These lobes can be a one piece design or multiple pieces assembled to create one piece. An alternative design shown in FIG. 5-9 could use the outer cam lobe 32 only. Providing surfaces 34 and 36. The valve stem 2 and spring 5 are replaced with a desmodromic valve assembly 12, 14 which obviates the need for the spring 5 of the conventional valve stem 2. The bearing surfaces of the lobes contact the upper valve stem 12 via roller bearings 50 that are secured with attachment means 52. The rotation 84 of the camshaft 30 sets the valves stems in motion within the valve stem assembly 28. The upper valve stem 12 makes contact with the lower valve stem 14 at contact surface 13 in the shared housing 42 which in turn opens the valve head 16. Following through the reciprocating motion created by the rotating camshaft 30 then closes the valve head 16 by means of the opposite direction of the upper valve stem created by the cam lobe and the valve is sealed. During this motion contact surface 13 is separated and compresses spring 40 seated in its retainer 44 as shown in FIG. 2. In other embodiments, the spring 40 could be replaced with a fluid 40 or a pliable material such as a heat resistant rubber 40 as shown in FIG. 8 and FIG. 9, respectively. The tolerances within the valve assembly are compensated by the spring 40. This allows the valve head 16 to seal tightly on the valve seat 18 and can be adjusted by the compression strength of the spring 40, the fluid 40, or other pliable material used in the shared housing 42. This seal allows for an efficient combustion within cylinder 82 in turn moving piston 80. The ports 72 and 74 allows for the air/fuel combustion mixture to flow. For clarity no means of spark to combust the air/fuel is shown. Within this valve stem assembly 28 consists of various seals/guides 20, 22, 24 and 26. All the components of the valve stem assembly could be pre-assembled in a valve stem assembly housing 29 for easy replacement. The cam lobes are enclosed by a cover 60 creating an oil compartments 62. The cover can have an oil fill 64 with seals 63 and attached with fasteners 66. Within the oil compartment could exist oil ports 68. Oil flow 69 is created and can be controlled with deflectors 67. The cylinder head valve assembly 10 also contains various coolant ports such as 70.

Figure 3:
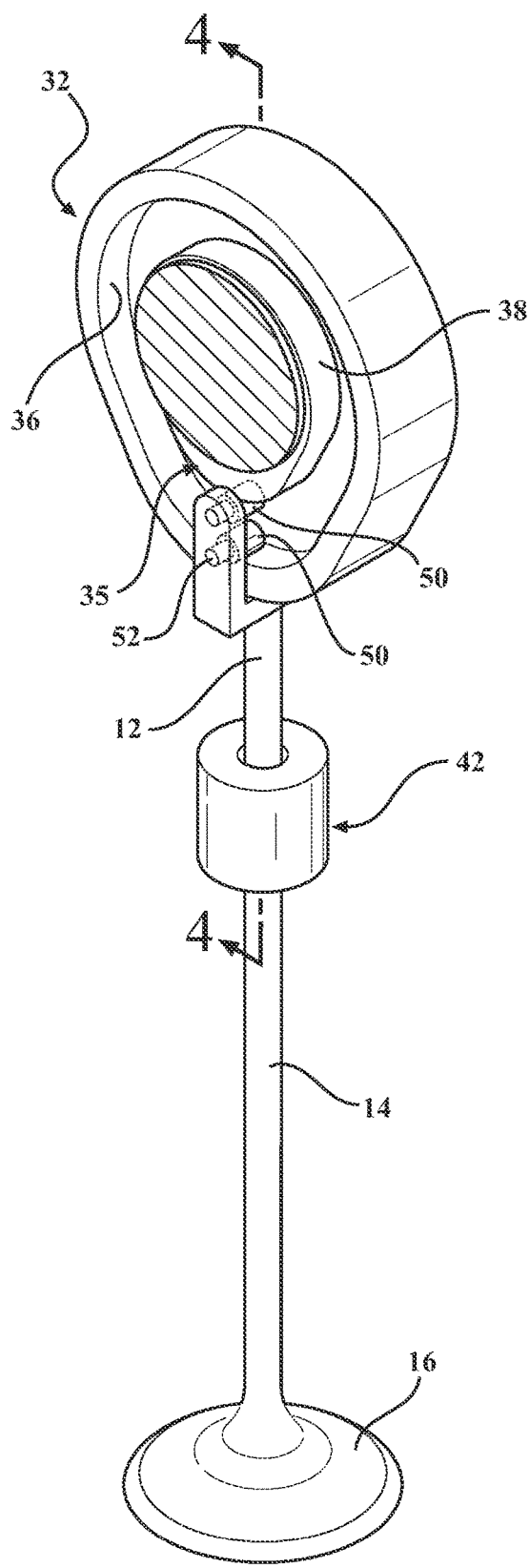
FIG. 3 Presents a 3 dimensional view to clarify the new design features and its working components.

FIG. 3 is a 3 dimensional view with a portion of the camshaft broken away showing the cam lobes to clarify the working components within the valve stem assembly housing 29 which is not shown. It shows the outer and inner cam lobes respectively 32 and 35. The bearing surfaces 36 and 38 of the cam lobes makes contact roller via bearings 50 attached to the upper valve stem 12. The roller bearings are attached to the upper valve stem by attachment means 52. The lower valve stem 14 is attached to upper valve stem by means of a shared housing 42 that can contain spring 40, fluid 40, or a softer material such as rubber 40 or any pliable material 40 which is heat resistant. Also within the shared housing is contact surface 13.

Figure 4:
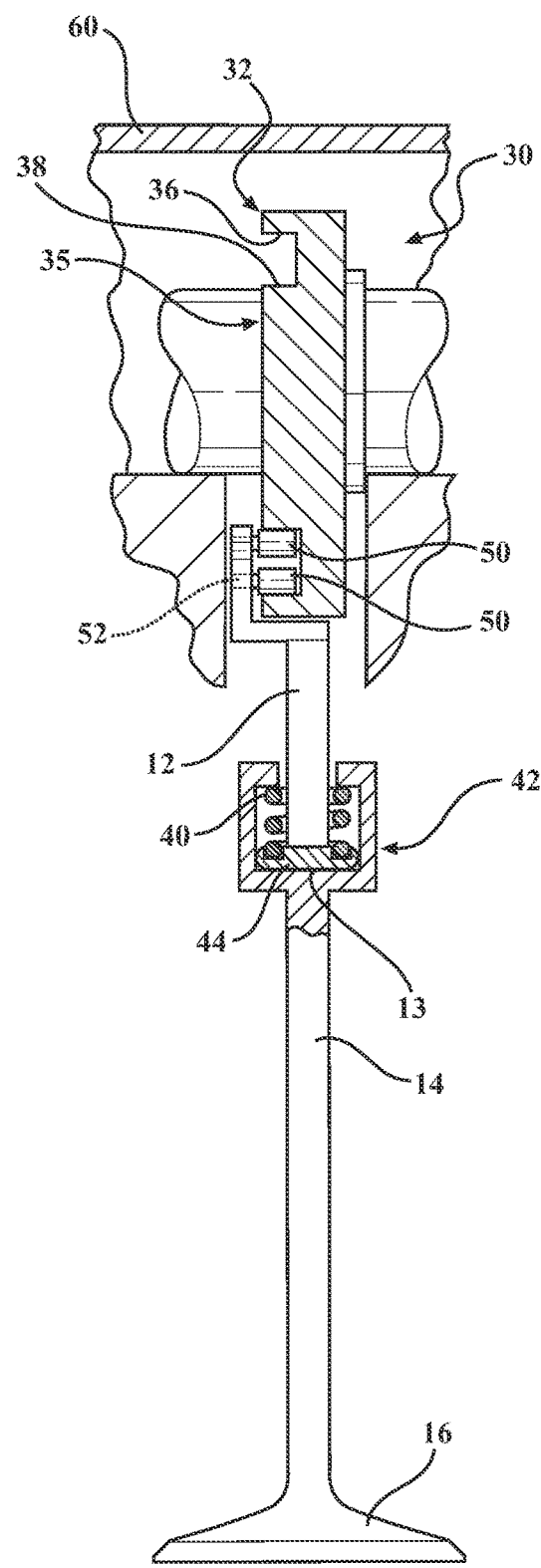
FIG. 4 is a cross sectional view of FIG. 3 to help clarify the new design features and its working components.

FIG. 4 is a cross-sectional view of FIG. 3. It is to clarify the cam lobes 32, 35 and the bearing surfaces 36 and 38 that contact roller bearings 50 attached to the upper valve stem 12. It also shows the shared housing 42 connecting the valve stems that could contain the previously mentioned features.

Figure 5:
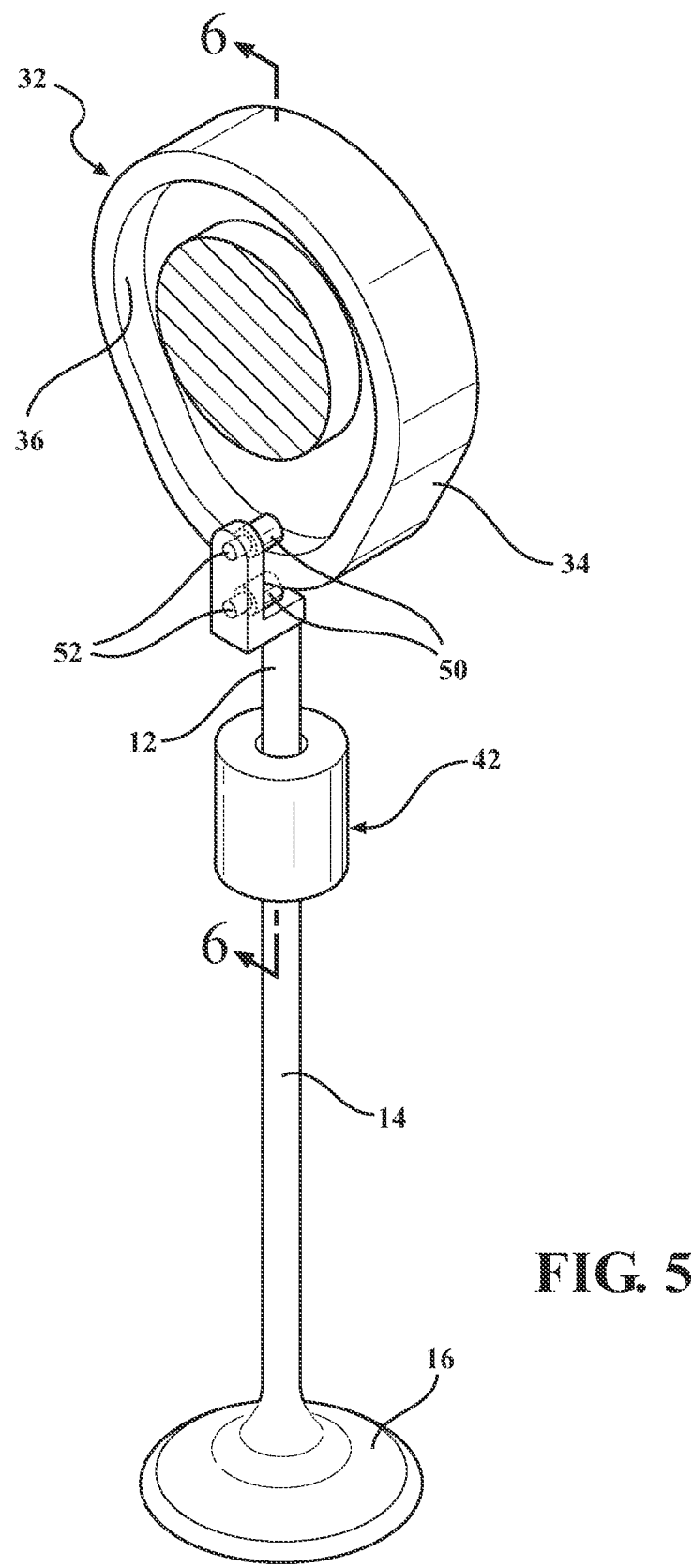
FIG. 5 is a 3 dimensional view of an alternative design of the cam lobe and bearing surfaces.

FIG. 5 shows a 3 dimensional view of an alternative cam lobe design. It consists of an outer cam lobe 32 only with bearing surfaces 34 and 36. These surfaces contact roller bearings 50 to allow valve motion. The inner cam lobe 35 and contact surface 38 are not needed.

Figure 6:
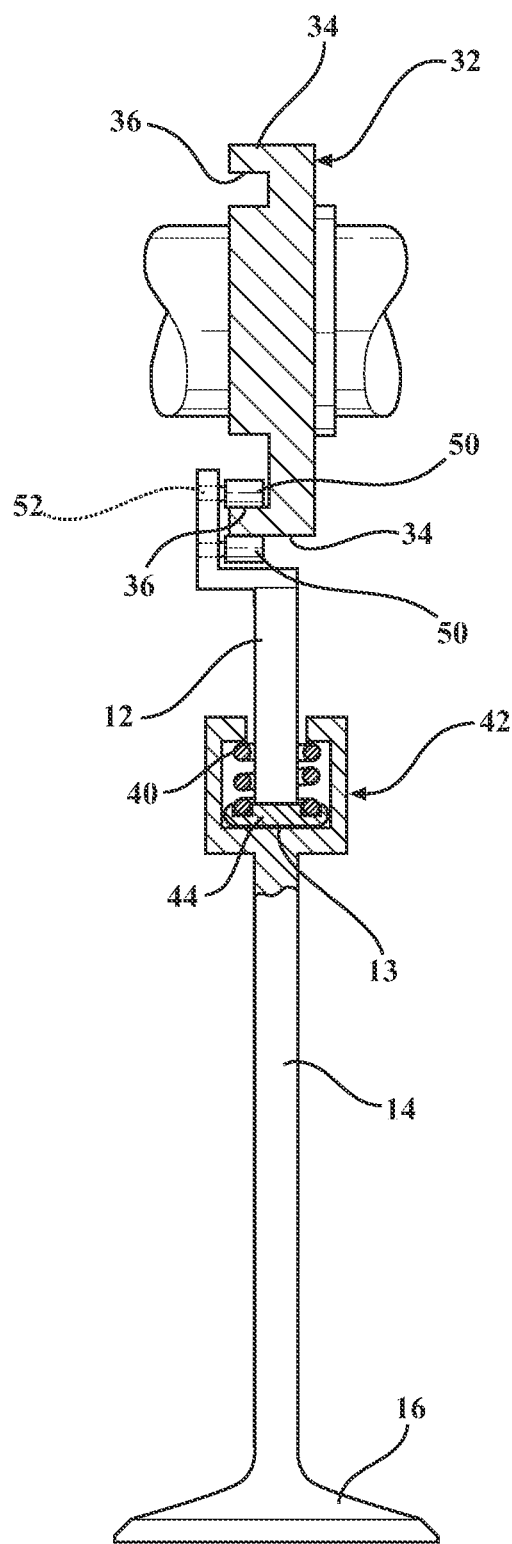
FIG. 6 is a cross sectional view of FIG. 5 to help clarify the alternative cam lobe design.

FIG. 6 is a cross sectional view of FIG. 5. It is to clarify the cam lobe 32 and its surfaces 34 and 36 that actuate the valve stems 12 and 14 and their shared components.

Figure 7:
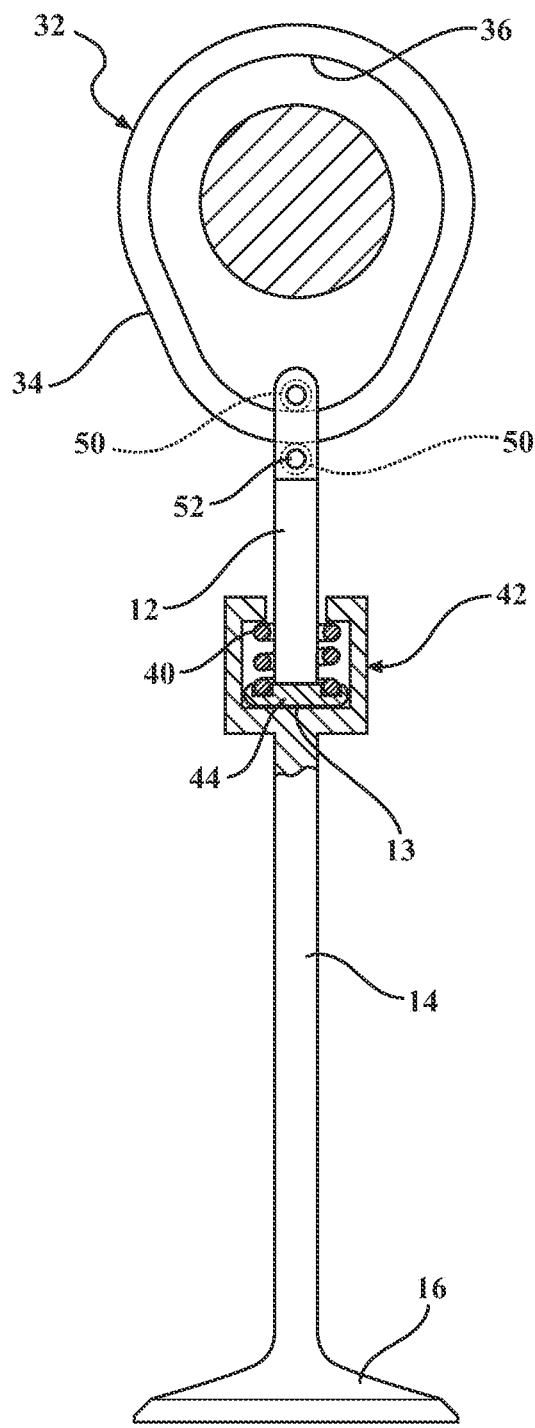
FIG. 7 is cross sectional view of FIG. 6 turned 90 degrees to help clarify the alternative cam lobe design.

FIG. 7 shows the alternative cam lobe design in section rotated 90 degrees from FIG. 6. This design allows the inner cam lobe to be eliminated as shown. The roller bearings 50 contact the outer cam lobe 32 on surfaces 34 and 36 only. This cam lobe design could be easier to produce as only one lobe is needed to be machined when manufacturing. It could be utilized with the previously shown valve features and all that are shown in the proceeding figures.

FIG. 8-9 shows alternative means in enclosure 42 to compensate for tolerances throughout the valve stem assembly to eliminate valve lash adjustments and seal the valve head. The valve stem enclosure could contain fluid or a pliable material such as rubber or anything of the sort that is heat resistant. This allows the upper and lower valve stem to make contact when opening the valve and seal the valve when it is closed.

Figure 10:
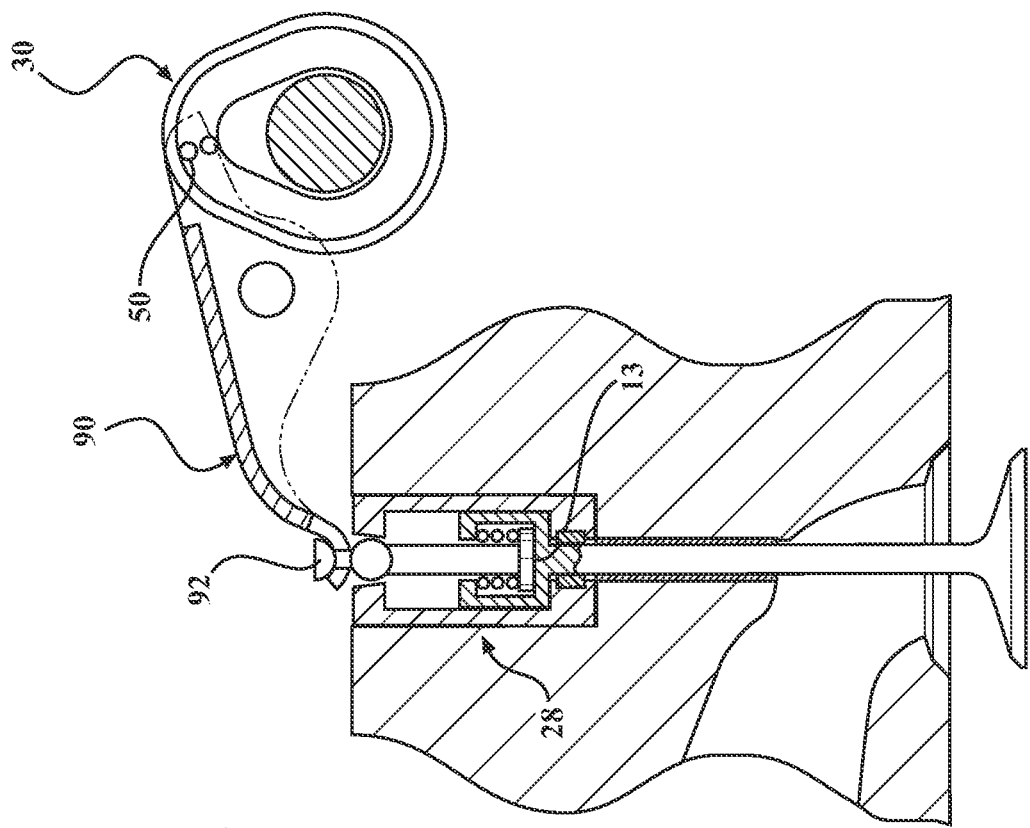
FIG. 10-11 shows in cross section an alternative design that can utilize the same design features previously mentioned with a rocker arm assembly with the cam shaft located below the rocker arm assembly.
Figure 11:
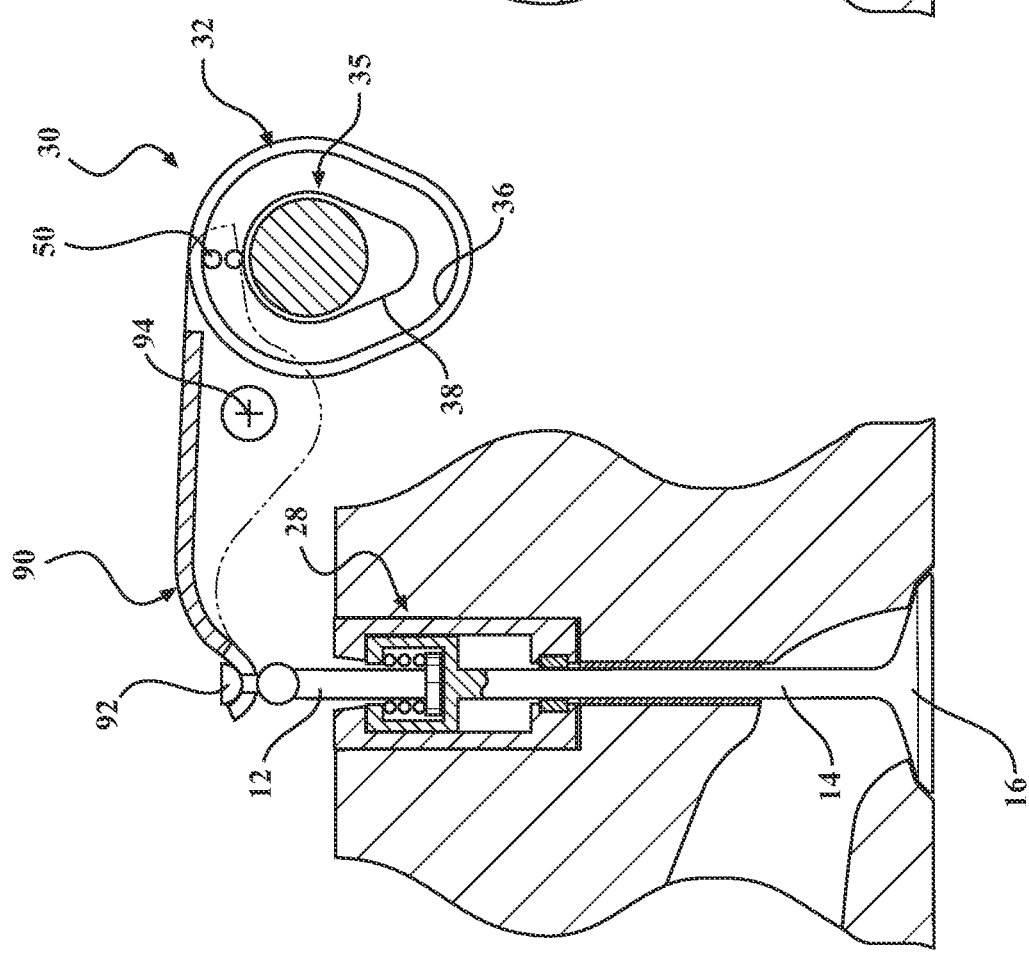

FIG. 10-11 is a cross-sectional view that shows an alternative design that represent the open and closed position of a valve assembly. This design can includes all previously mentioned features but with the difference being the cam lobe 30 actuates the valve stems 12, 14 and all its components via a rocker arm assembly 90 attached to the upper valve stem by mechanism 92. The rocker assembly could contain fixed pivot point 94 however it is not necessary. The bearings 50 and attachment 52 are attached to the rocker arm assembly 90 and contact the camshaft lobe surfaces.

Figure 12:
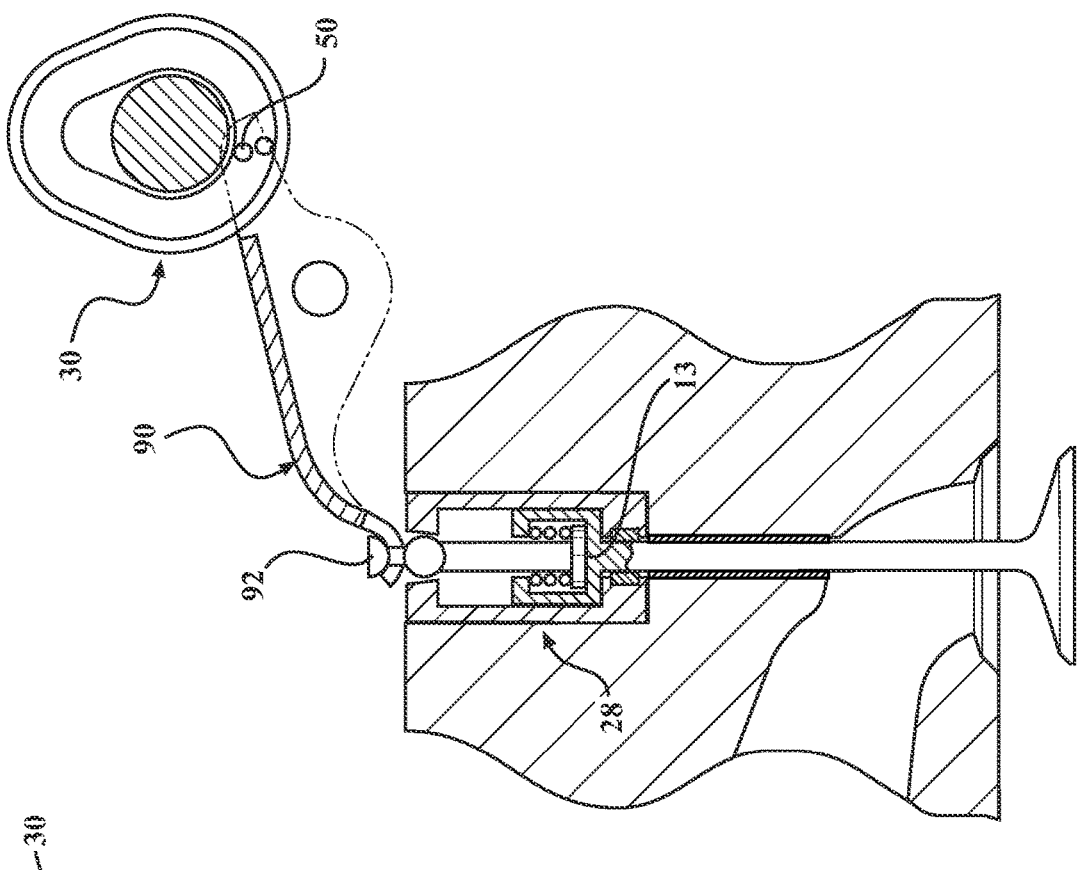
FIG. 12-13 shows in cross section an alternative design that can utilize all the same design features previously mentioned with a rocker arm assembly with the cam shaft above the rocker arm assembly.
Figure 13:
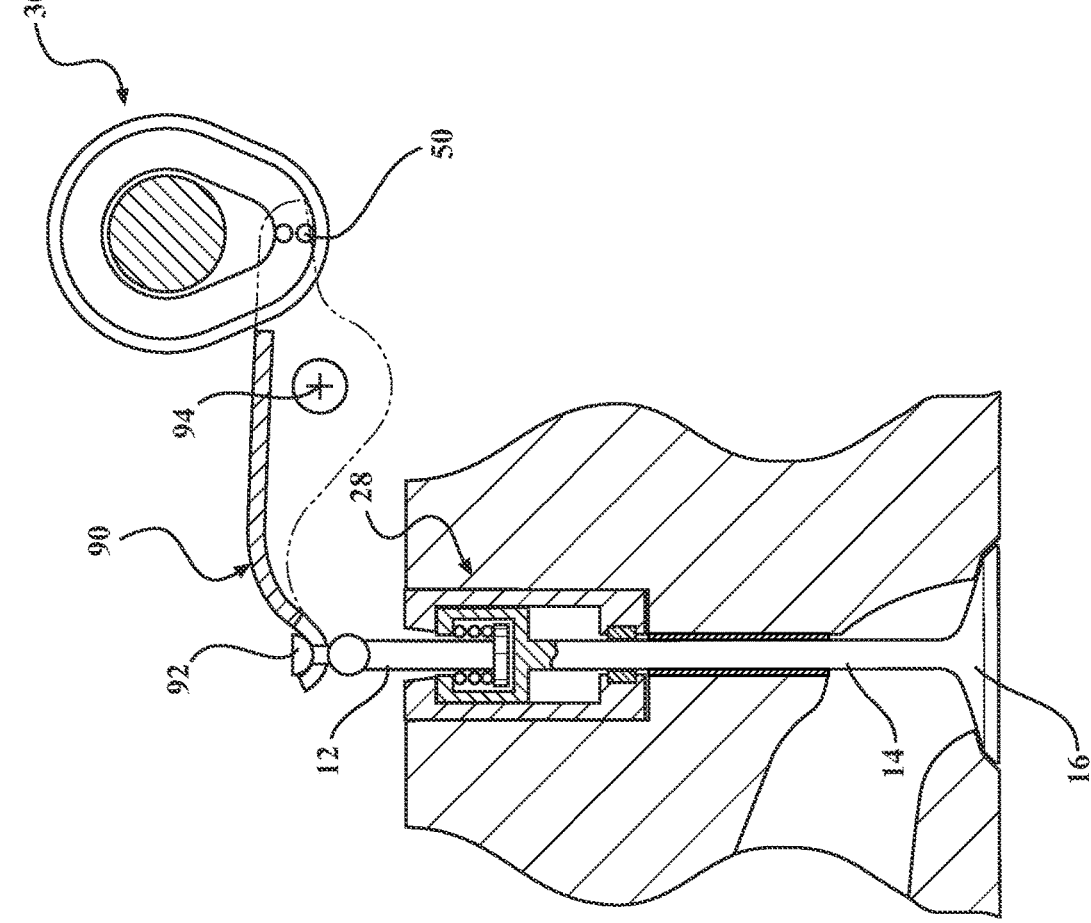

FIG. 12-13 again is a cross-sectional view of an alternative design in open and closed position that operates in the same manner as FIGS. 10-11 however the difference being that the cam shaft 30 is above the rocker arm assembly 90 as opposed to below.

Figure 14:
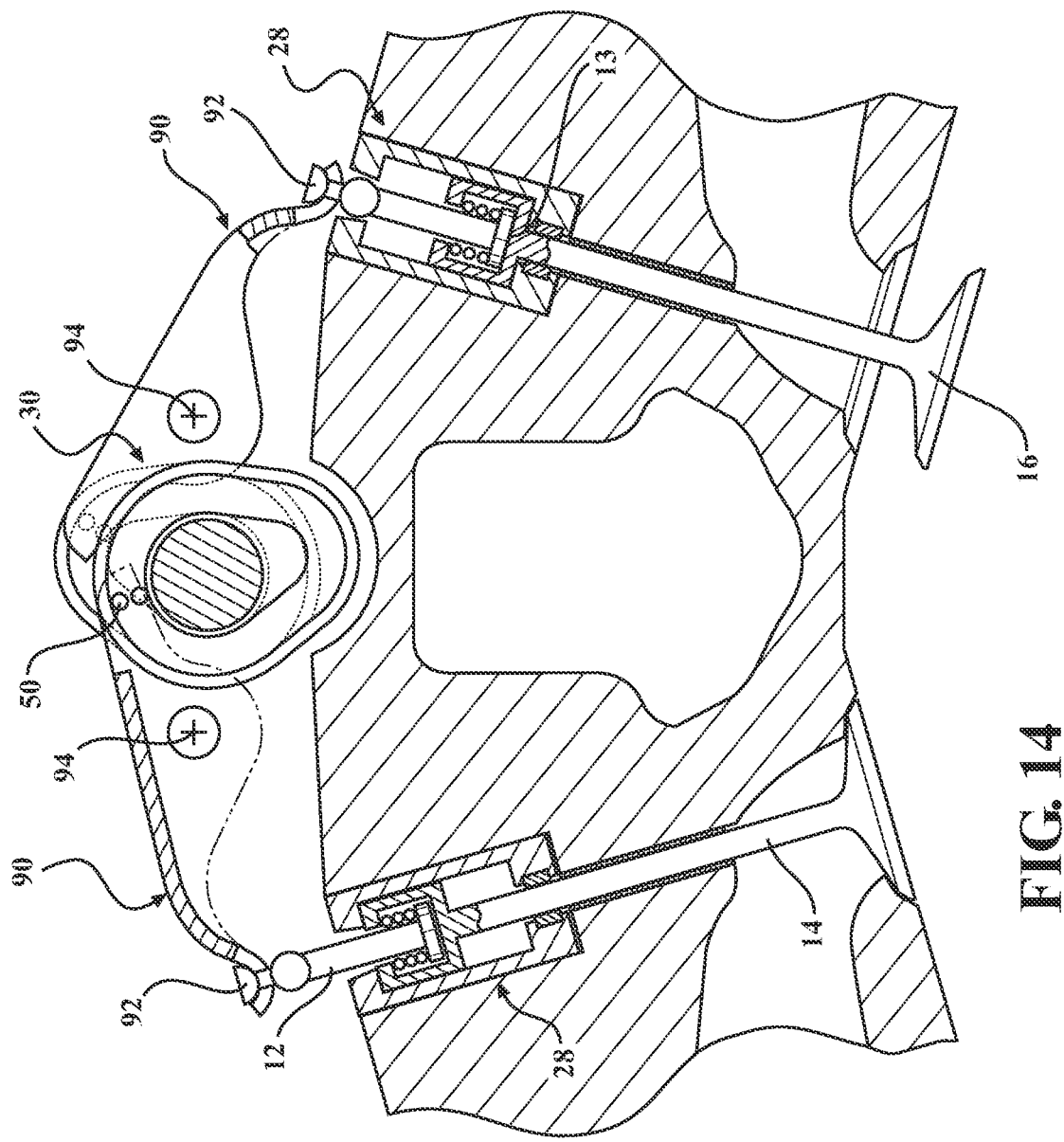
FIG. 14 shows in cross section an alternative design that has a single overhead cam (SOHC) with a rocker assembly.

FIG. 14 is another cross-sectional view showing an alternative embodiment that could include all previously mentioned features with the difference being a single overhead camshaft (SOHC) that actuates the valve assemblies via rocker arm assemblies 90 that could pivot on a fixed point 94 but not necessary. All the previously mentioned alternative assemblies can be applied to the new camshaft design containing a single cam lobe as well.

FIG. 15-16 are schematic views. FIG. 16 is a view turned 90 degree of FIG. 15. They show the preferred cam shaft 30 relationship to the valve stems 12 and 14. The camshafts rotating axis 31 has its lobes in alignment with valve stems 12 and 14 along center line 17. The roller bearings 50 are centered with axis 17 as well.

The invention claimed is:
1. A valve train for an internal combustion engine including at least one cylinder and a cylinder head which partially defines the at least one cylinder, the valve train comprising:
    a camshaft rotatably mounted to the cylinder head;
    at least one cam mounted to the camshaft, the at least one cam including a peripheral groove formed on an axial end face of the at least one cam so as to define an inner cam lobe and an outer cam lobe;
    at least one desmodromic valve assembly corresponding to each cylinder, the at least one desmodromic valve assembly extending through the cylinder head so as to directly engage an associated cam of the at least one cam thereby cyclically opening and closing the at least one desmodromic valve assembly against a port of the corresponding cylinder as the camshaft rotates, the at least one desmodromic valve assembly including:
        an upper valve stem including an upper end and a lower end, and
        a lower valve stem including a lower end defining a valve head, and an upper end defining a shared housing configured to slidably receive the lower end of the upper valve stem,
    wherein the associated cam of each desmodromic valve assembly is configured to (i) move the upper valve stem into contact with a lower contact surface of the shared housing when opening the at least one desmodromic valve assembly, and (ii) pull the upper valve stem towards an upper stop of the shared housing so as to seal the valve head against a valve seat of the port when closing the at least one desmodromic valve assembly.

2. The valve train according to claim 1, wherein the at least one desmodromic valve assembly further includes a spring pressed between the upper stop and a spring retainer arranged at the lower end of the upper valve stem.

3. The valve train according to claim 1, wherein the at least one desmodromic valve assembly further includes a fluid or a pliable material arranged in the shared housing between the upper stop and the lower end of the upper valve stem.

4. The valve train according to claim 1, wherein the upper end of the upper valve stem includes an upper roller bearing and a lower roller bearing which cooperate to engage the associated cam.

5. The valve train according to claim 4, wherein the upper and lower roller bearings are arranged within the peripheral groove of the associated cam so as to respectively engage an outer bearing surface of the inner cam lobe and an inner bearing surface of the outer cam lobe.

6. The valve train according to claim 4, wherein the upper roller bearing is arranged within the peripheral groove of the associated cam so as to engage an inner bearing surface of the outer cam lobe, and the lower roller bearing engages an outer bearing surface of the outer cam lobe.

7. The valve train according to claim 1, wherein the at least one desmodromic valve assembly is encased in a valve stem assembly housing so as to be installed in the cylinder head as a pre-assembly.

8. The valve train according to claim 1, wherein the camshaft is enclosed in an oil compartment defined by the cylinder head and a cylinder head cover, the oil compartment being filled with oil configured to cool and lubricate the camshaft.

9. A valve train for an internal combustion engine including at least one cylinder and a cylinder head which partially defines the at least one cylinder, the valve train comprising:
  a camshaft rotatably mounted to the cylinder head;
  at least one cam mounted to the camshaft, the at least one cam including a peripheral groove formed on an axial end face of the at least one cam so as to define an inner cam lobe and an outer cam lobe;
  at least one desmodromic valve corresponding to each cylinder, the at least one desmodromic valve extending through the cylinder head so as to directly engage an associated cam of the at least one cam thereby cyclically opening and closing the at least one desmodromic valve against a port of the corresponding cylinder as the camshaft rotates, the at least one desmodromic valve including:
    a valve stem,
    a valve head formed at a lower end of the valve stem, and
    an upper roller bearing and a lower roller bearing which are rotatably coupled to an upper end of the valve stem via an attachment means,
  wherein the upper and lower roller bearings are arranged within the peripheral groove of the associated cam so as to respectively engage an outer bearing surface of the inner cam lobe and an inner bearing surface of the outer cam lobe.

10. The valve train according to claim 9, wherein the valve stem is formed as a valve stem assembly including:
  an upper valve stem including an upper end which comprises the upper and lower roller bearings, and
  a lower valve stem including a lower end defining the valve head, and an upper end defining a shared housing configured to slidably receive a lower end of the upper valve stem,
  wherein the associated cam of each desmodromic valve is configured to (i) move the upper valve stem into contact with a lower contact surface of the shared housing when opening the at least one desmodromic valve assembly, and (ii) pull the upper valve stem towards an upper stop of the shared housing so as to seal the valve head against a valve seat of the port when closing the at least one desmodromic valve assembly.

11. The valve train according to claim 10, wherein the valve stem assembly further includes a spring pressed between the upper stop and a spring retainer arranged at the lower end of the upper valve stem.

12. The valve train according to claim 10, wherein the valve stem assembly further includes a fluid or a pliable material arranged in the shared housing between the upper stop and the lower end of the upper valve stem.

13. The valve train according to claim 10, wherein the valve stem assembly is encased in a valve stem assembly housing so as to be installed in the cylinder head as a pre-assembly.

14. The valve train according to claim 9, wherein the camshaft is enclosed in an oil compartment defined by the cylinder head and a cylinder head cover, the oil compartment being filled with oil configured to cool and lubricate the camshaft.

15. A valve train for an internal combustion engine including at least one cylinder and a cylinder head which partially defines the at least one cylinder, the valve train comprising:
  a camshaft rotatably mounted to the cylinder head;
  at least one cam mounted to the camshaft, the at least one cam including a peripheral groove formed on an axial end face of the at least one cam so as to define an inner cam lobe and an outer cam lobe;
  at least one desmodromic valve assembly corresponding to each cylinder, the at least one desmodromic valve assembly extending through the cylinder head, the at least one desmodromic valve assembly including:
    an upper valve stem including an upper end and a lower end, and
    a lower valve stem including a lower end defining a valve head, and an upper end defining a shared housing configured to slidably receive the lower end of the upper valve stem;
  a center-pivot rocker arm assembly arranged between the at least one desmodromic valve assembly of the corresponding cylinder and an associated cam of the at least one cam, the rocker arm assembly configured to transfer actuating motions from the associated cam to the at least one desmodromic valve assembly so as to cyclically open and close the at least one desmodromic valve assembly against a port of the corresponding cylinder as the camshaft rotates, the rocker arm assembly including:
    a cam end configured to engage the associated cam via a first roller bearing and a second roller bearing, and
    a valve end pivotally coupled to the at least one desmodromic valve assembly,
  wherein the associated cam actuates the at least one desmodromic valve assembly via the rocker arm assembly such that (i) the upper valve stem moves into contact with a lower contact surface of the shared housing when opening the at least one desmodromic valve assembly, and (ii) the upper valve stem is pulled towards an upper stop of the shared housing so as to seal the valve head against a valve seat of the port when closing the at least one desmodromic valve assembly.

16. The valve train according to claim 15, wherein the at least one desmodromic valve assembly further includes a spring pressed between the upper stop and a spring retainer arranged at the lower end of the upper valve stem.

17. The valve train according to claim 15, wherein the at least one desmodromic valve assembly further includes a fluid or a pliable material arranged in the shared housing between the upper stop and the lower end of the upper valve stem.

18. The valve train according to claim 15, wherein the first and second roller bearings are arranged within the peripheral groove of the associated cam so as to respectively engage an outer bearing surface of the inner cam lobe and an inner bearing surface of the outer cam lobe.

19. The valve train according to claim 15, wherein the first roller bearing is arranged within the peripheral groove of the associated cam so as to engage an inner bearing surface of the outer cam lobe, and the second roller bearing engages an outer bearing surface of the outer cam lobe.

20. The valve train according to claim 15, wherein the at least one desmodromic valve assembly is encased in a valve stem assembly housing so as to be installed in the cylinder head as a pre-assembly.

* * * * *